US012187006B2

(12) United States Patent
Stinard et al.

(10) Patent No.: US 12,187,006 B2
(45) Date of Patent: Jan. 7, 2025

(54) BAG FORMING APPARATUS

(71) Applicant: Ranpak Corp., Concord Township, OH (US)

(72) Inventors: Brian J. Stinard, Twinsburg, OH (US); Robert C. Cheich, Independence, OH (US); Dennis J. Wagner, Painesville, OH (US)

(73) Assignee: Ranpak Corp., Concord Township, OH (US)

( * ) Notice: Subject to any disclaimer, the term of this patent is extended or adjusted under 35 U.S.C. 154(b) by 16 days.

(21) Appl. No.: 17/907,521

(22) PCT Filed: Mar. 15, 2021

(86) PCT No.: PCT/US2021/022304
§ 371 (c)(1),
(2) Date: Sep. 27, 2022

(87) PCT Pub. No.: WO2021/194778
PCT Pub. Date: Sep. 30, 2021

(65) Prior Publication Data

US 2023/0142122 A1 May 11, 2023

Related U.S. Application Data

(60) Provisional application No. 63/001,067, filed on Mar. 27, 2020.

(51) Int. Cl.
*B31B 70/00* (2017.01)
*B31B 70/26* (2017.01)
(Continued)

(52) U.S. Cl.
CPC ............ *B31B 70/003* (2017.08); *B31B 70/26* (2017.08); *B31B 70/99* (2017.08); *B31B 2150/0016* (2017.08); *B31B 2160/20* (2017.08)

(58) Field of Classification Search
CPC ....... B31B 70/003; B31B 70/99; B31B 70/26; B31B 2160/20; B31B 2150/0016
(Continued)

(56) References Cited

U.S. PATENT DOCUMENTS 2,307,990 A 1/1943 Briggs
3,243,937 A 4/1966 Ragan
4,892,511 A * 1/1990 Luciano ................ B31B 70/005
493/194

FOREIGN PATENT DOCUMENTS

BE 528876 A 4/1957
BE 539468 A 7/1959
(Continued)

OTHER PUBLICATIONS

International Search Report and Written Opinion mailed Jun. 17, 2021, for priority International Patent Application No. PCT/US2021/022304.

(Continued)

*Primary Examiner* — Robert F Long
*Assistant Examiner* — Xavier A Madison
(74) *Attorney, Agent, or Firm* — Renner, Otto, Boisselle & Sklar, LLP

(57) ABSTRACT

A bag forming apparatus for forming a flat bottom of a bag includes a base, opposing sidewalls that extend upright relative to the base, and a top that is operably coupled to an upper portion of each of the sidewalls. The top has an intermediate pivot axis between the sidewalls that enables the top to pivot about the pivot axis between a collapsed state and an expanded state. In the collapsed state, the upper portions of the respective sidewalls are closer together and the top extends upright relative to the base to form a tip for insertion into an opening of the bag. In the expanded state, the upper portions of the respective sidewalls are spaced
(Continued)

further apart and the top extends horizontally relative to the base to form a platform for forming the flat bottom of the bag.

17 Claims, 8 Drawing Sheets

(51) Int. Cl.

| | |
|---|---|
| ***B31B 70/99*** | (2017.01) |
| *B31B 150/00* | (2017.01) |
| *B31B 160/20* | (2017.01) |

(58) Field of Classification Search
USPC .......................................................... 493/243
See application file for complete search history.

(56) References Cited

FOREIGN PATENT DOCUMENTS

| | | | |
|---|---|---|---|
| CN | 110861353 | A | 3/2020 |
| FR | 1426341 | A | 1/1966 |
| FR | 2854834 | A1 | 11/2004 |

OTHER PUBLICATIONS

International Preliminary Report on Patentability issued Sep. 22, 2022, for priority International Patent Application No. PCT/US2021/022304.

* cited by examiner

BAG FORMING APPARATUS

This application is a national phase of International Patent Application No. PCT/US2021/022304 filed Mar. 15, 2021, which claims priority to U.S. Provisional Patent Application No. 63/001,067 filed Mar. 27, 2020, each of which is hereby incorporated herein by reference in its entirety.

TECHNICAL FIELD

The present invention relates to bags, such as paper bags, and more particularly to a bag forming apparatus for forming the bottom of such bags.

BACKGROUND

Paper bags are used for a wide variety of applications, including the storage and transportation of goods or waste. Many conventional paper bags are formed from single-ply kraft paper using complex machinery. Generally, such machinery first folds the sheet and adheres at least two of its edges to form a tube. Then an open end of the tube is folded via the complex machinery to form a bottom of the bag. The bag can then be opened such that the bottom of the bag is flat, generally planar and generally perpendicular to adjacent side walls of the bag. Such bag forming machinery typically is large, expensive, and is designed to mass produce such bags for later point of use at a remote location.

SUMMARY

The present disclosure describes a bag forming apparatus with a simplified construction that enables a user to manually form a flat bottom of a bag, such as at the point of use.

The bag forming apparatus may be designed as a relatively small fixture in a retail sales location, a packaging facility, or an assembly line, for example, in which a user forms the flat bottom of the bag from a tubular segment just prior to its use.

The simplified construction of the bag forming apparatus may make it inexpensive to manufacture and reproduce, and thus may be deployed at one or more point-of-use locations. The bag forming apparatus also may be easily transportable for further facilitating its point-of-use functionality.

The bag forming apparatus may be particularly useful for forming the flat bottom of multi-walled bags, and more particularly multi-walled materials that are difficult to handle and fold in conventional bag-folding machinery. Such multi-walled materials may include cushioning or insulating materials, such as slit sheet materials or other open-celled materials, that are particularly difficult to handle and fold in an automated machine.

According to an aspect of the present disclosure, a bag forming apparatus for forming a bottom of a bag includes: a base; opposing sidewalls, each sidewall being operably coupled at a lower portion thereof for enabling movement of the sidewalls relative to each other; a top operably coupled to an upper portion of each of the sidewalls, the top having an intermediate pivot axis between the sidewalls, wherein the top is pivotable about the pivot axis to move between a collapsed state and an expanded state; where in the collapsed state, the upper portions of the respective sidewalls are closer together and the top extends upright relative to the base to form a tip that is configured for being received in an opening of the bag; and where in the expanded state, the upper portions of the respective sidewalls are spaced further apart and the top extends horizontally relative to the base to form a platform that is configured for forming the flat bottom of the bag.

According to another aspect of the present disclosure, a bag forming apparatus for forming a paper bag having a flat bottom includes: a base; first and second sidewalls that extend upright relative to the base, each of the first and second sidewalls being hinged for pivotable movement relative to the base and relative to each other; and a top having a first top portion that is hinged to the first sidewall, and a second top portion that is hinged to the second sidewall, the first and second top portions being hinged together at an intermediate pivot location between the first and second sidewalls for enabling the first and second top portions to pivot relative to each other between a collapsed state and expanded; where in the collapsed state, the first and second top portions are inclined relative to the base to form a tip that is configured to facilitate the top and sidewalls to be received in an opening of the bag; and where in the expanded state, the first and second top portions are horizontal relative to the base to form a platform that is configured to facilitate formation of the flat bottom of the bag.

According to another aspect of the present disclosure, a method of forming a flat-bottomed bag includes the following steps: (i) placing a bag preform over a top and opposing sidewalls of a bag forming apparatus that is in a collapsed state, where in the collapsed state the top of the apparatus extends upright relative to a base of the apparatus to form a tip that is received in an opening of the bag preform during the placing step; (ii) engaging the top of the apparatus, where the engaging step causes the top to pivot about an intermediate portion of the top to an expanded state, where in the expanded state the top extends horizontally relative to the base of the apparatus to form a platform; and (iii) forming a flat bottom of the bag preform on the platform to thereby form the flat-bottomed bag.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the present disclosure.

DETAILED DESCRIPTION

Figure 1:
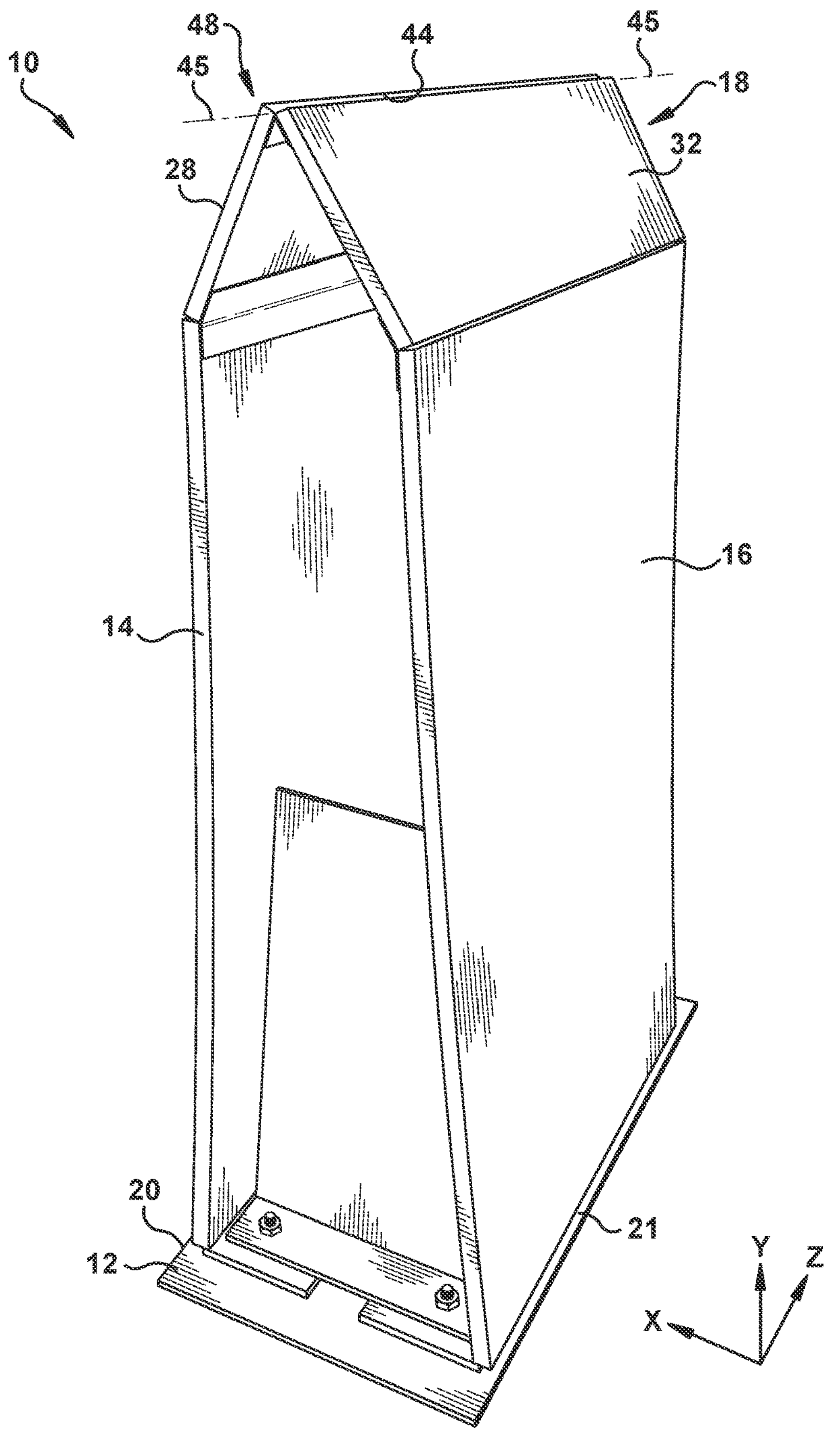
FIG. 1 is a perspective top, front view of an exemplary bag forming apparatus according to an embodiment of the present disclosure.

The principles and aspects of the present invention have particular application to forming the flat bottom of bags made of multi-layered materials, and thus will be described below chiefly in this context. The principles and aspects of the present invention may be applicable to forming other suitable materials, including single-ply materials such as kraft paper and the like, where it is desirable to provide a simple apparatus that may be deployed at the point of use for such bags.

As described above, flat-bottomed paper bags are currently formed with large and complex machines, typically limited to a manufacturing facility. The bag-forming apparatus described here is compact and potentially portable, allowing for installation at the point of use. In exemplary embodiments the bag-forming apparatus is not automated, however, and requires manual labor, so it may not be suitable for high-volume applications.

Referring now to the drawings in detail, and initially to FIGS. 1-4, the drawings show an exemplary bag-forming apparatus 10 for forming a flat bottom of a bag. The bag-forming apparatus 10 generally includes a base 12, first and second sidewalls 14, 16 extending upwardly relative to the base 12, and a top 18 that is operably coupled to each of the first and second sidewalls 14, 16. As described in further detail below, the top 18 is deployable between a collapsed state that forms a relatively narrow tip configured for ready receipt in an opening of the bag or a bag preform, and an expanded state that forms a platform for forming the bottom of the bag.

The base 12 may be any suitable structure or structures that support the sidewalls 14, 16, the top 18, and any other components of the apparatus 10. In the illustrated embodiment, the base 12 includes a flat plate having a quadrilateral (e.g., rectangular) shape. In exemplary embodiments, the base 12 is a single unitary structure, with each of the sidewalls 14, 16 being operably coupled to the base 12. In other embodiments, the base 12 may include multiple discrete base parts, with each sidewall 14, 16 being operably coupled to a respective base part. The apparatus 10 may be attached to the ground via the base 12, or the apparatus 10 may be configured for transport to different point of use locations.

Figure 7:
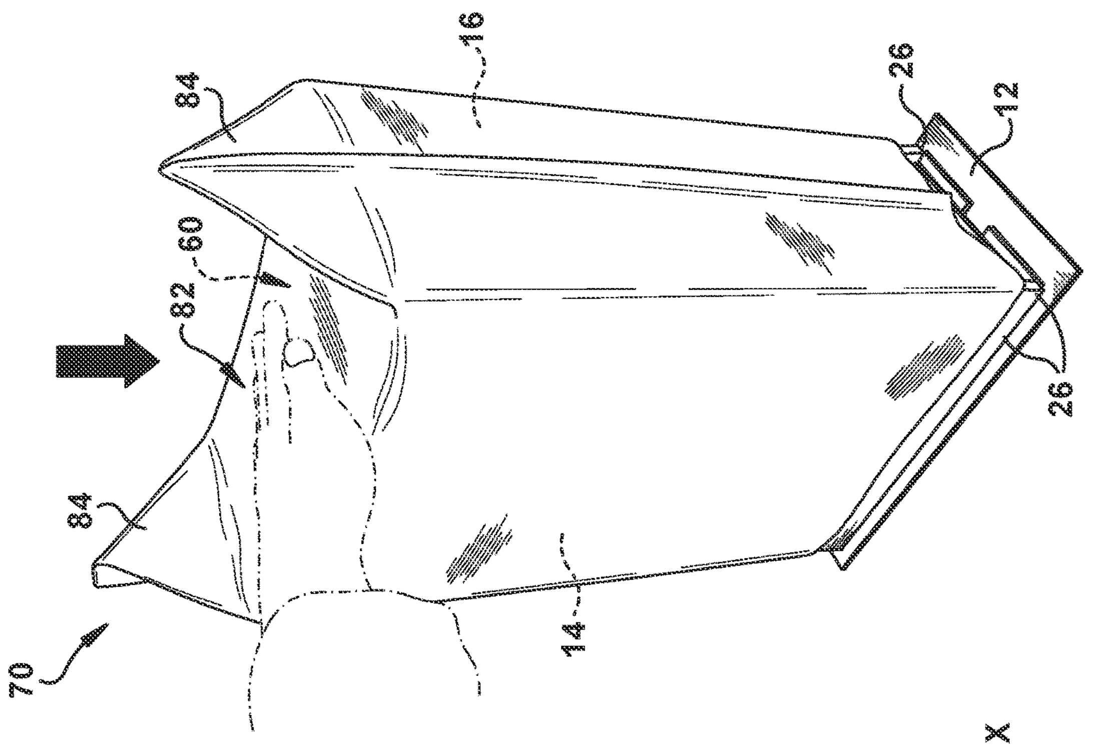
FIGS. 6-10 show exemplary method steps of forming the flat bottom of the bag in FIG. 5 with the bag forming apparatus in FIG. 1.
Figure 6:
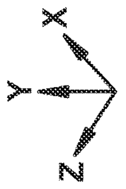
Figure 6:
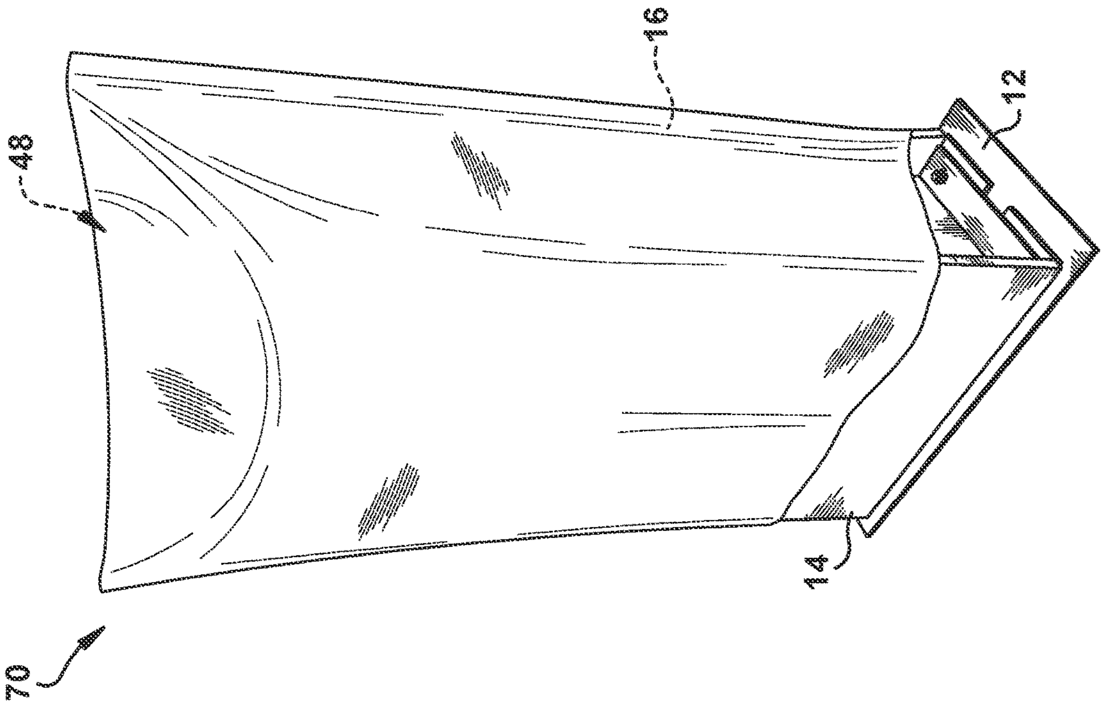
Figure 8:
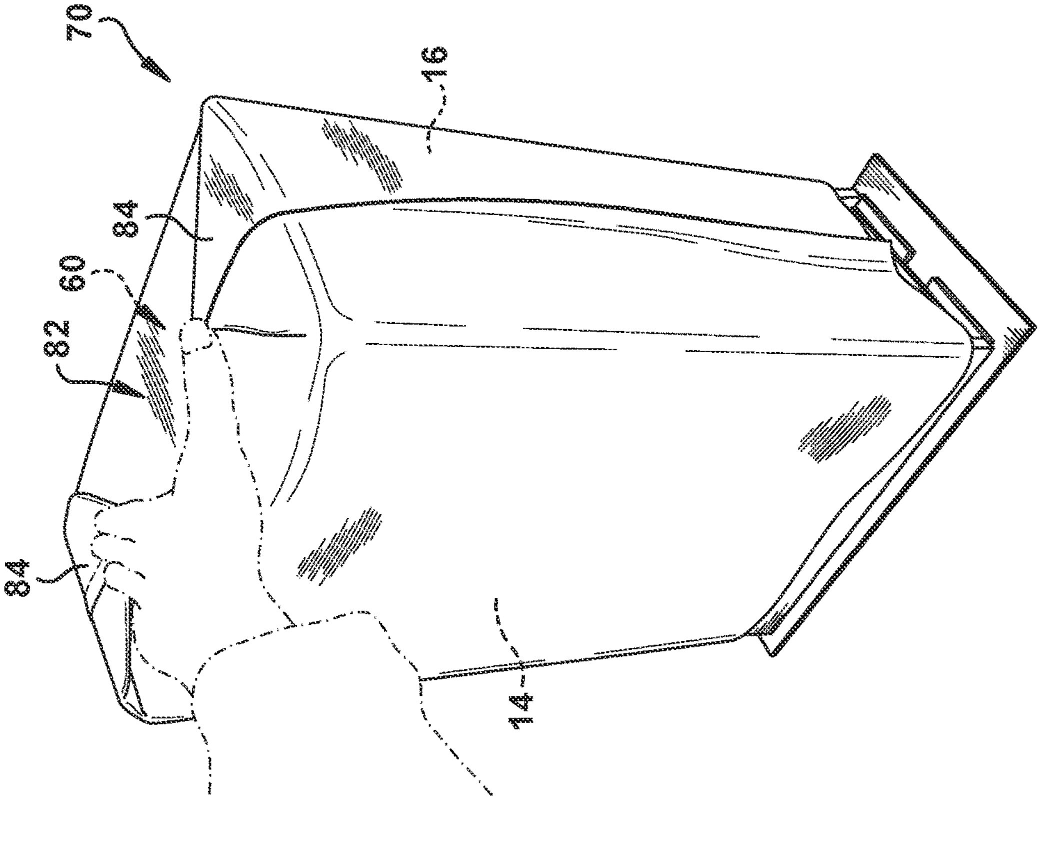

The sidewalls 14, 16 may have any suitable configuration for supporting the top 18 of the apparatus 10 at an elevated position relative to the base 12 when forming the bottom of the bag. As shown, the sidewalls 14, 16 extend upright to an elevation that is a sufficient distance above the base 12 that will permit the sides of the bag or bag preform to extend downwardly over the sidewalls 14, 16 when the bottom of the bag is being formed on the top 18 (as shown in FIGS. 6-8, for example, and described in further detail below). As a result, the length of the sidewalls 14, 16 generally approximates the height of the finished bag.

In the illustrated embodiment, the sidewalls 14, 16 are formed by continuous flat plates that extend along a majority of the lateral sides 20, 21 of the base 12 in a depth direction (Z). In exemplary embodiments, the sidewalls 14, 16 are a single unitary piece, however, in other embodiments the sidewalls 14, 16 may be formed by multiple discrete or integrated pieces.

In exemplary embodiments, each of the first and second sidewalls 14, 16 are hinged for pivotable movement relative to the base 12 and relative to each other between the collapsed state and the expanded state. As shown in the illustrated embodiment, the sidewalls 14, 16 may be hinged at their respective lower portions 22, 24 with respective lower hinges 26 that pivotably couple the sidewalls 14, 16 to spaced apart locations, such as at opposite sides 20, 21 of the base 12. The lower hinges 26 may be any suitable hinges for providing such pivotable movement between the sidewalls and the base. For example, the lower hinges 26 may be discrete parts that are operably coupled to the respective sidewalls 14, 16 and to the base 12; or the lower hinges 26 may form one or more parts of one or more of the sidewalls 14, 16 or one or more parts of the base 12, or a combination thereof.

As shown, the top 18 of the apparatus 10 includes a first top portion 28 that is operably coupled to an upper portion 30 of the first sidewall 14, and a second top portion 32 that is operably coupled to an upper portion 34 of the second sidewall 16. In exemplary embodiments, the first and second top portions 28, 32 are hinged at their respective lateral edges 36, 38 to the respective first and second sidewalls 14, 16 using respective upper hinges 40. The upper hinges 40 may be any suitable hinges for providing relative pivotable movement between the sidewalls 14, 16 and the top 18 as they move relative to one another between the collapsed state and the expanded state. For example, the upper hinges 40 may be discrete parts that are operably coupled to the sidewalls 14, 16 and the respective first and second top portions 28, 32; or the upper hinges 40 may form one or more parts of one or more of the sidewalls 14, 16 one or more parts of the top 18, or a combination thereof.

Figure 2:
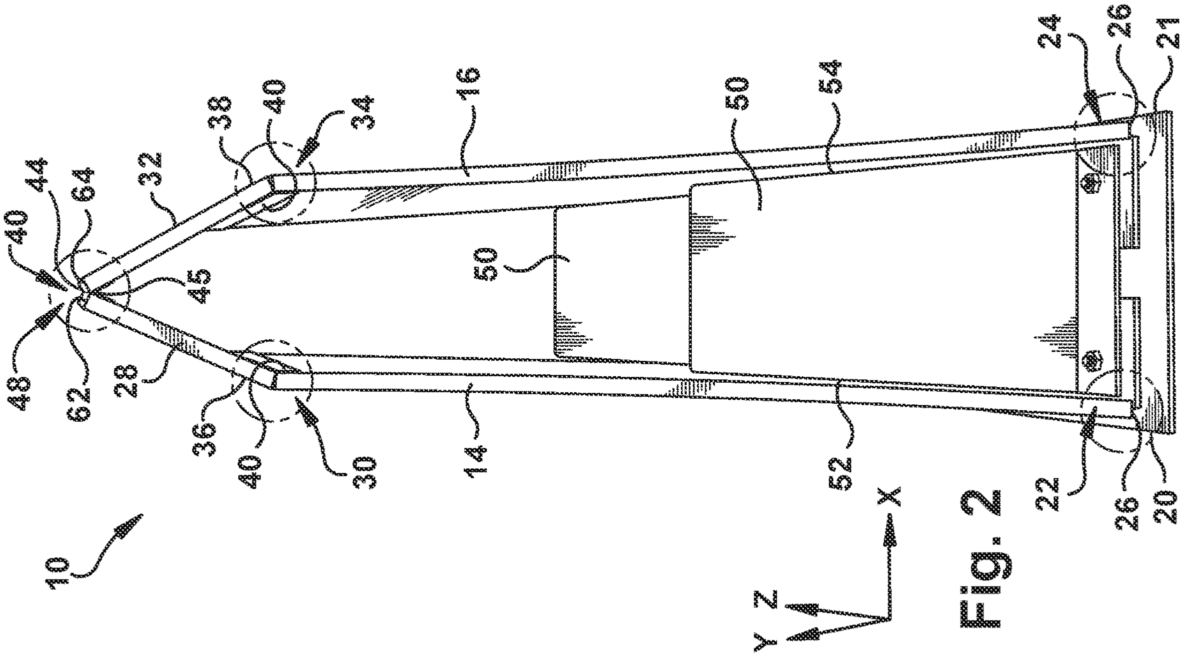
FIG. 2 is a front view of the bag forming apparatus shown in an exemplary collapsed state.
Figure 3:
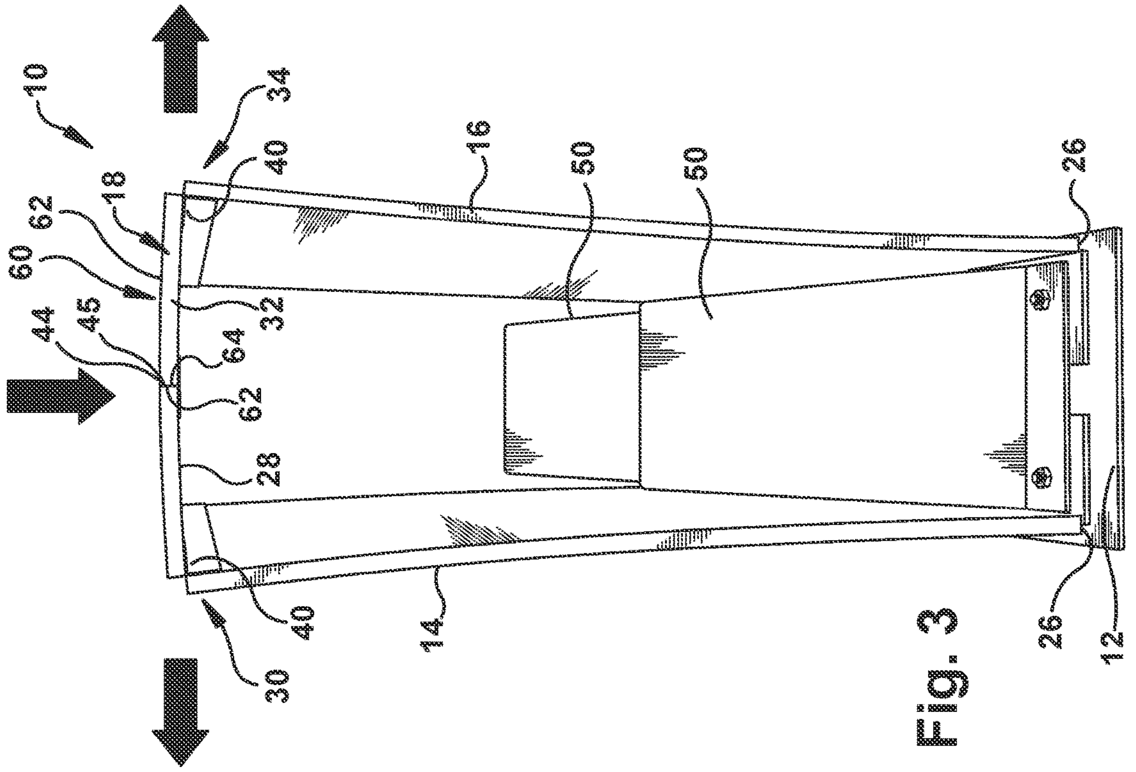
FIG. 3 is a front view of the bag forming apparatus shown in an exemplary expanded state.

In exemplary embodiments, the first and second top portions 28, 32 are hinged together at an intermediate pivot location 42 between the first and second sidewalls 14, 16. This hinged configuration enables the first and second top portions 28, 32 to pivot relative to each other between the collapsed state (as shown in FIG. 2, for example) and the expanded state (as shown in FIG. 3, for example). In the illustrated embodiment, the first and second top portions 28, 32 are hinged together at the intermediate pivot location 42 using a suitable intermediate hinge 44. The intermediate hinge 44 may be a discrete part that is operably coupled to the first and second top portions 28, 32; or the intermediate hinge 44 may form one or more parts of the first and second top portions 28, 32. As described in further detail below, pivoting of the first and second top portions 28, 32 relative to each other about a pivot axis 45 of the intermediate hinge 44 will result in the first and second sidewalls 14, 16 pivoting relative to each other via the respective upper and lower hinges 40, 26. This, in turn, may enable the apparatus 10 to have a relatively slender form in its collapsed state for enabling placement of the bag or bag preform over the apparatus, and a relatively broad form in its expanded state for enabling formation of the bottom of the bag.

FIG. 2 shows the apparatus 10 in an exemplary collapsed state. In moving to the collapsed state, the first and second top portions 28 32 pivot toward each other about the intermediate hinge 44 such that they extend upright relative to the base 12 and cooperate with the sidewalls 14, 16 to form a relatively narrow tip 48. In the illustrated embodiment, the tip 48 is formed at the intermediate pivot location 40 which is at an elevation above the first and second sidewalls 14, 16. The tip 40 may have any suitable configuration for facilitating insertion into an opening of the bag or bag preform. For example, as shown in the illustrated embodiment, the first and second top portions 28, 32 may be inclined upwardly (in a height direction, Y) and inwardly (in a width direction, X) toward each other, such that the tip 40 has a generally pointed triangular profile. Alternatively, the tip 40 may have a more rounded or squared profile. Any suitable number of intermediate hinges 44 or top portions (e.g., 28, 32) may be employed to achieve the desired profile of the tip 40 when the apparatus 10 is in the collapsed state.

As shown, when the apparatus 10 is in the collapsed state, the respective upper portions 30, 34 of the first and second sidewalls 14, 16 are located closer to each other by virtue of their connection to the top 18 via the upper hinges 40. In exemplary embodiments, the sidewalls 14, 16 are permitted to laterally pivot in this manner by virtue of their connection to the base 12 via the lower hinges 26. Alternatively or additionally, the sidewalls 14, 16 may be configured to flex to accommodate such movement, for example if they are non-pivotably fixed to the base 12. In the illustrated embodiment, the first and second sidewalls 14, 16 are inclined upwardly in the height direction (Y) and inwardly toward each other in the width direction (X) to provide a relatively slender profile for the apparatus 10 in the collapsed state. This slender profile provided by both the top and sidewalls 14,16 further facilitates placing the bag or bag preform over the apparatus 10. Other suitable configurations for the sidewalls 14, 16 are possible in the collapsed state, such as extending upright perpendicularly to the base 12; or extending upwardly and outwardly from each other, for example.

In exemplary embodiments, the apparatus 10 may further include one or more upright supports 50 that are arranged in the space between the first and second sidewalls 14, 16. As shown, the upright supports 50 are configured to engage and support the opposing sidewalls 14, 16 when the apparatus 10 is in the collapsed state, which helps to prevent the apparatus 10 from falling down. In the illustrated embodiment, the upright supports 50 each have tapered lateral surfaces 52, 54 that correspond with the inward incline of the opposing sidewalls 14, 16 in the collapsed state. In this manner, the upright supports 50 may align with and engage each of the sidewalls 14, 16 along a majority of the tapered support surfaces 52, 54 when in the collapsed state. In the illustrated embodiment, the apparatus 10 includes two upright supports 50 that are spaced apart in the depth direction (Z) of the apparatus, although any suitable number of supports 50 may be provided depending on the number or size or a combination thereof of the sidewalls 14, 16, for example.

Figure 4:
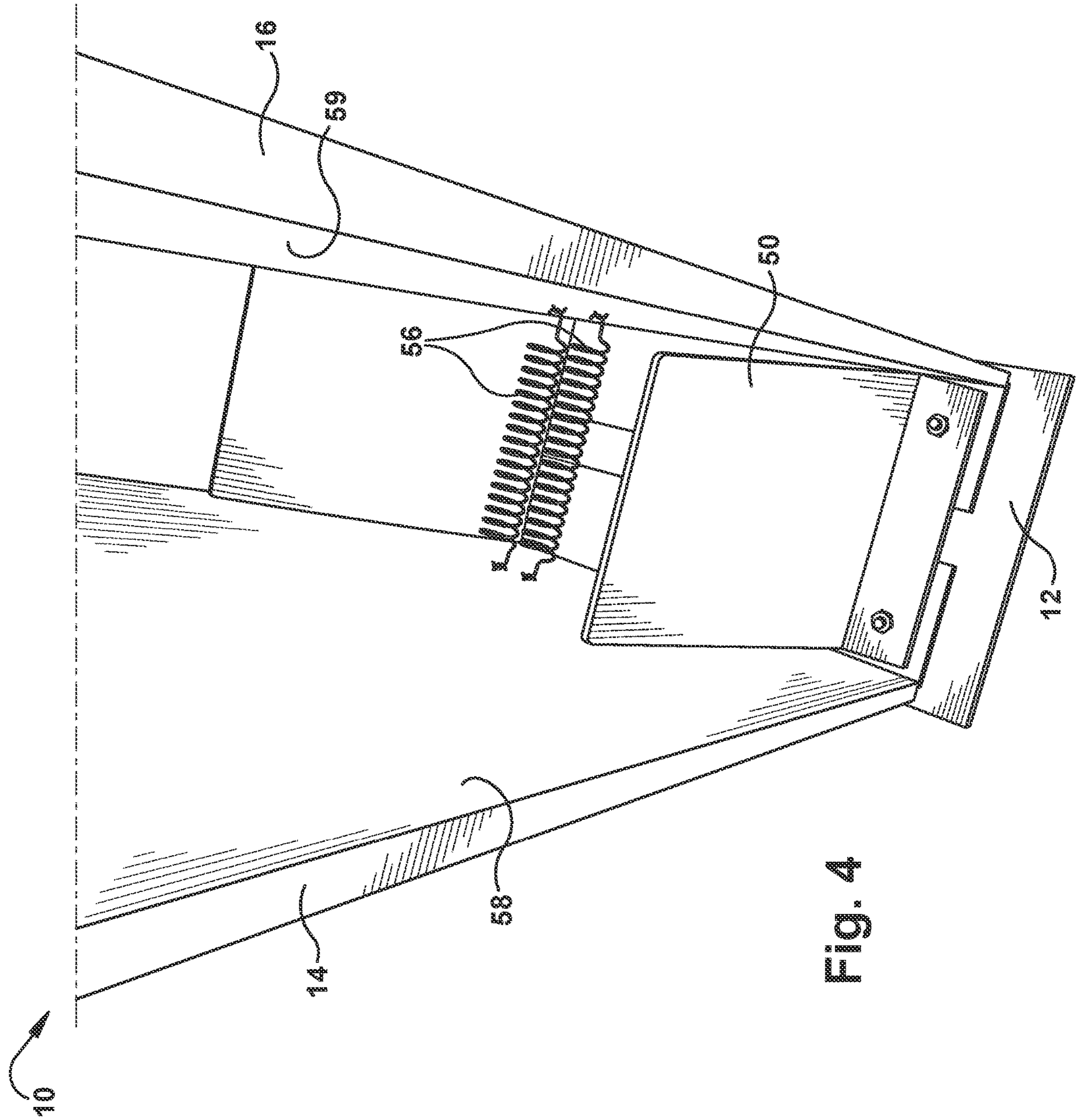
FIG. 4 is an enlarged perspective view showing an inside portion of the bag forming apparatus.

Referring to FIG. 4, the apparatus 10 may further include a biasing member 56 that is operably coupled to each of the first and second sidewalls 14, 16. The biasing member 56 may be configured to bias the apparatus 10 to the collapsed state, so as to provide an automatic return to the collapsed state after forming the bottom of the bag in the expanded state. The biasing member 56 may be any suitable structure configured to bias the apparatus 10 to the collapsed state. In the illustrated embodiment, for example, the biasing member 56 includes one or more coil springs 56 interposed between the first and second sidewalls 14, 16. The coil springs 56 are attached to the respective inner surfaces 58, 59 of the sidewalls 14, 16 and urge them inwardly toward each other. This, in turn, urges the first and second top portions 30, 34 of the sidewalls 14, 16 to pivot toward each other about the intermediate hinge 44 to form the tip 48 in the collapsed state.

Figure 10:
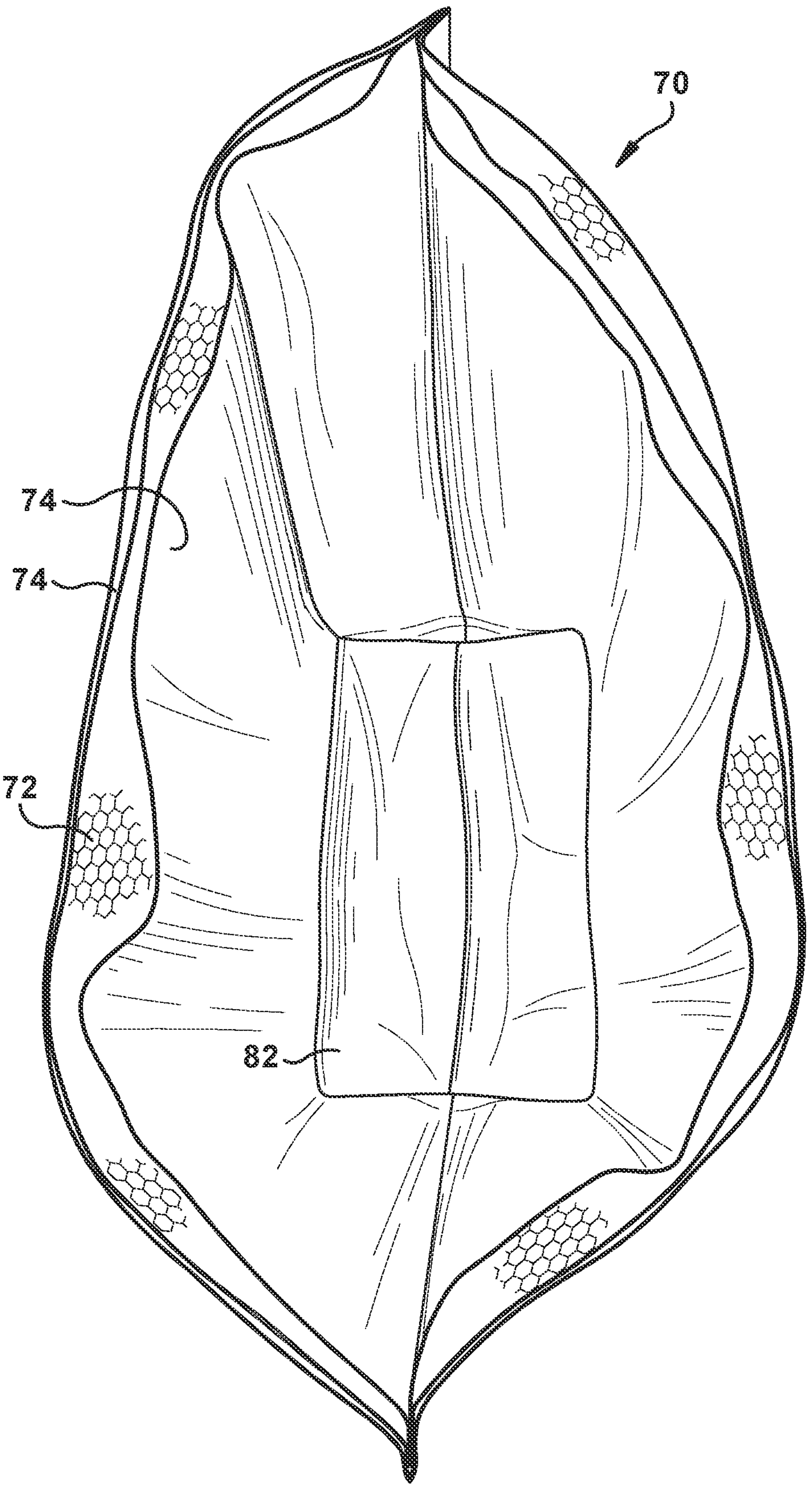
Figure 16:
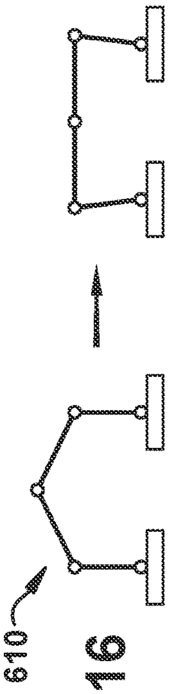
FIGS. 11-20 show various alternative embodiments of exemplary bag forming apparatuses according to the present disclosure.
Figure 17:
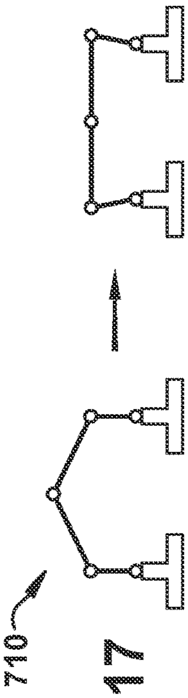
Figure 18:
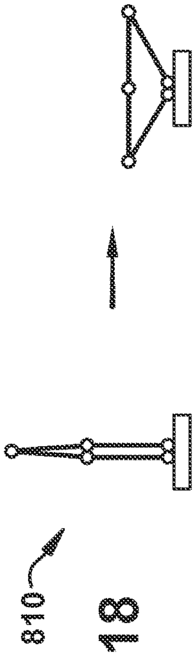
Figure 19:
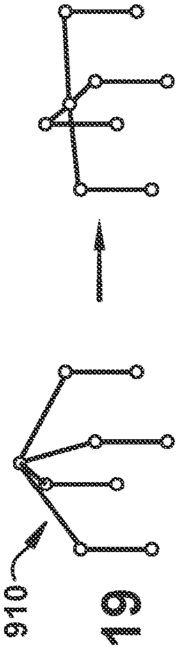
Figure 20:
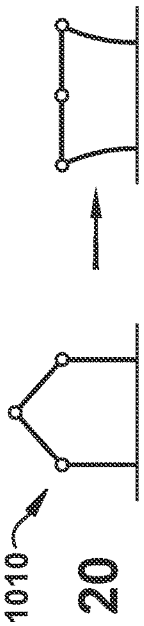
Figure 11:
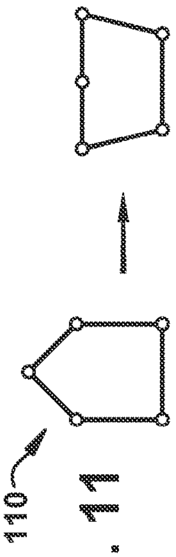
Figure 12:
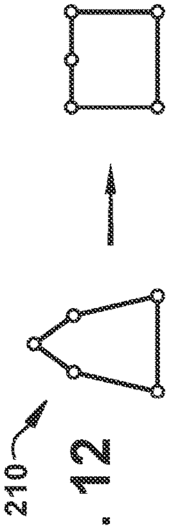
Figure 13:
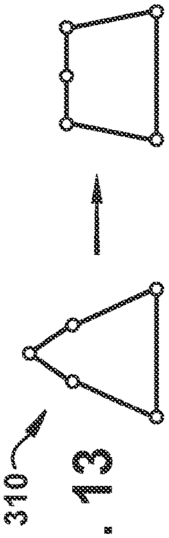
Figure 14:
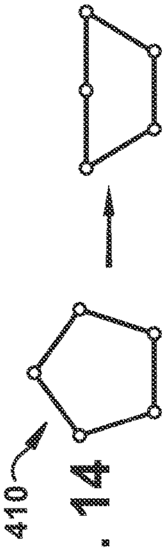
Figure 15:
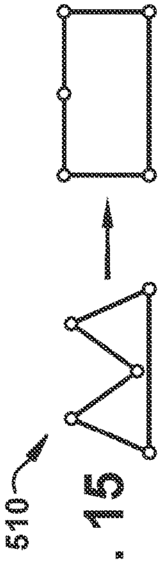

Referring to FIG. 3, the apparatus is shown in an exemplary expanded state. As shown in the expanded state, the first and second top portions 28, 32 are aligned with the intermediate hinge 44 in a common horizontal plane to form a platform 60. The platform 60 is facilitates formation of the bottom of the bag (as shown in FIGS. 8 and 10, for example, and described in further detail below).

As shown, when the top 18 pivots to the expanded state, the respective upper portions 30, 34 of the first and second sidewalls 14, 16 hinged to the top 18 move outwardly away from each such that they are spaced further apart when compared to the collapsed state. In exemplary embodiments, the sidewalls 14, 16 are permitted to laterally pivot in this manner by virtue of their connection to the base 12 via the lower hinges 26. Alternatively or additionally, the sidewalls 14, 16 may be configured to flex to accommodate such lateral outward movement, for example if they are non-pivotably fixed to the base 12. In the illustrated expanded state, the first and second sidewalls 14, 16 are inclined upwardly (in the height direction, Y) and outwardly away from each other (in the width direction, X). Such a configuration maintains the relatively narrow lower portion of the apparatus 10, which may help prevent tearing of the upper part of the bag during the bottom-forming process. Other suitable configurations for the sidewalls 14, 16 are possible in the expanded state, such as extending upright perpendicularly to the base 12; or extending upwardly and inwardly inclined toward each other, for example.

In exemplary embodiments, the apparatus 10 may include suitable stops for restricting the pivotable movement of the top 18 or the sidewalls 14, 16 or a combination thereof beyond predetermined positions or orientations. In the illustrated embodiment, for example, the first and second top portions 28, 32 have respective mating faces 62, 64 at the intermediate pivot location 40 which serve as stops. As shown, the respective mating faces 62, 64 are configured to engage each other when the apparatus 10 is in the expanded state, thereby restricting further pivotable movement of the top 18 beyond a horizontal position. Other suitable stops may be provided, such as overlapping projections, or the like. The intermediate hinge 44 also may include a stop. Alternatively or additionally, the first and second sidewalls 14, 16 also may include suitable stops for preventing movement of these members beyond desired orientations in the collapsed state or the expanded state or a combination thereof.

The top 18 of the apparatus 10 may have any suitable configuration for accommodating formation of the bottom of the bag. Generally, the shape of the platform 60 formed by the top 18 will correspond with the shape of the bottom of the bag. In the illustrated embodiment, for example, the first and second top portions 28, 32 each have a thin rectangular shape, which in the expanded state forms a larger rectangular shape. In addition, the exemplary first and second top portions 28, 32 have flat upper surfaces, and are configured to lie horizontally coplanar with each other when in the expanded state. Such an exemplary configuration of the top 18 forms a platform 60 with a flat upper surface 62 that, in turn, enables the bottom of the bag to be formed with a flat bottom surface. The flatness of the platform 60 may have a reasonable amount of variation and still provide a desired flatness for the bottom of the bag. Other suitable configurations of the platform 60 are possible, such as other polygonal shapes (e.g., square, triangular, trapezoidal, etc.); or the platform 60 may have a circular or oval shape. The platform 60 also may be provided with non-flat surfaces, such as a bulging (convex) upper surface for forming a dished bottom of the bag.

The components of the apparatus 10, including the base 12, sidewalls 14, 16, top 18, and supports 50 may be made from any suitable material (or combination of materials) to accommodate the functionality of those components. For example, such components of the apparatus 10 may be made from metals, plastics, composites, in various forms and combinations, which may be selected in a well-known manner. In exemplary embodiments, one or more of these components of the apparatus 10 may be made from lightweight and relatively inexpensive materials, such as sheet metal or plastic, for example.

The respective hinges of the apparatus 10, including the lower hinges 26, upper hinges 40, and one or more intermediate hinges 44, may be in the form of discrete parts that are operably coupled to their respective hinged parts. Non-limiting examples of such hinges include: butt hinges, barrel hinges, continuous hinges, pivot (knife) hinges, spring hinges, and the like. Alternatively or additionally, one or more of the respective hinges 26, 40, 44 may form a part of their respective hinged parts. For example, the intermediate hinge 44 may be a barrel-type hinge in which the first top portion 28 forms one part of a barrel, and the second top portion 32 forms the other part of the barrel, with a separate hinge pin extending through the barrel. Alternatively or additionally, one or more of the respective hinges 26, 40, 44 may be a living hinge, in which at least one of the hinged parts is integral and unitary with the hinge. For example, the first and second top portions 28, 32 may form a unitary top 18 with the intermediate hinge 44 being formed as a living hinge. Such living hinges may be particularly advantageous if the components of the apparatus are made of plastic or composites. Likewise, the sidewalls 14, 16 may be formed integrally with the top 18 or the base 12 or some combination thereof, with respective living hinge connections permitting pivotable movement between these connected components in the manner described above.

In some embodiments, one or more components of the apparatus, including the base 12, the sidewalls 14, 16, or the top 18, may be made of flexible materials that can provide the desired amount of movement between the collapsed and expanded state without using hinged connections. For example, a flexible sidewall 14 or 16 or both could be non-movably coupled to the base 12 or the top 18 or some combination thereof, and still provide the desired lateral movement when the top 18 is deployed between the collapsed state and the expanded state. Likewise, flexible first and second top portions 28, 32 could be non-movably coupled together to provide the desired range of movement about a pivot axis (e.g., 45) of the top 18 to transform between the tip 48 and the platform 60.

Figure 5:
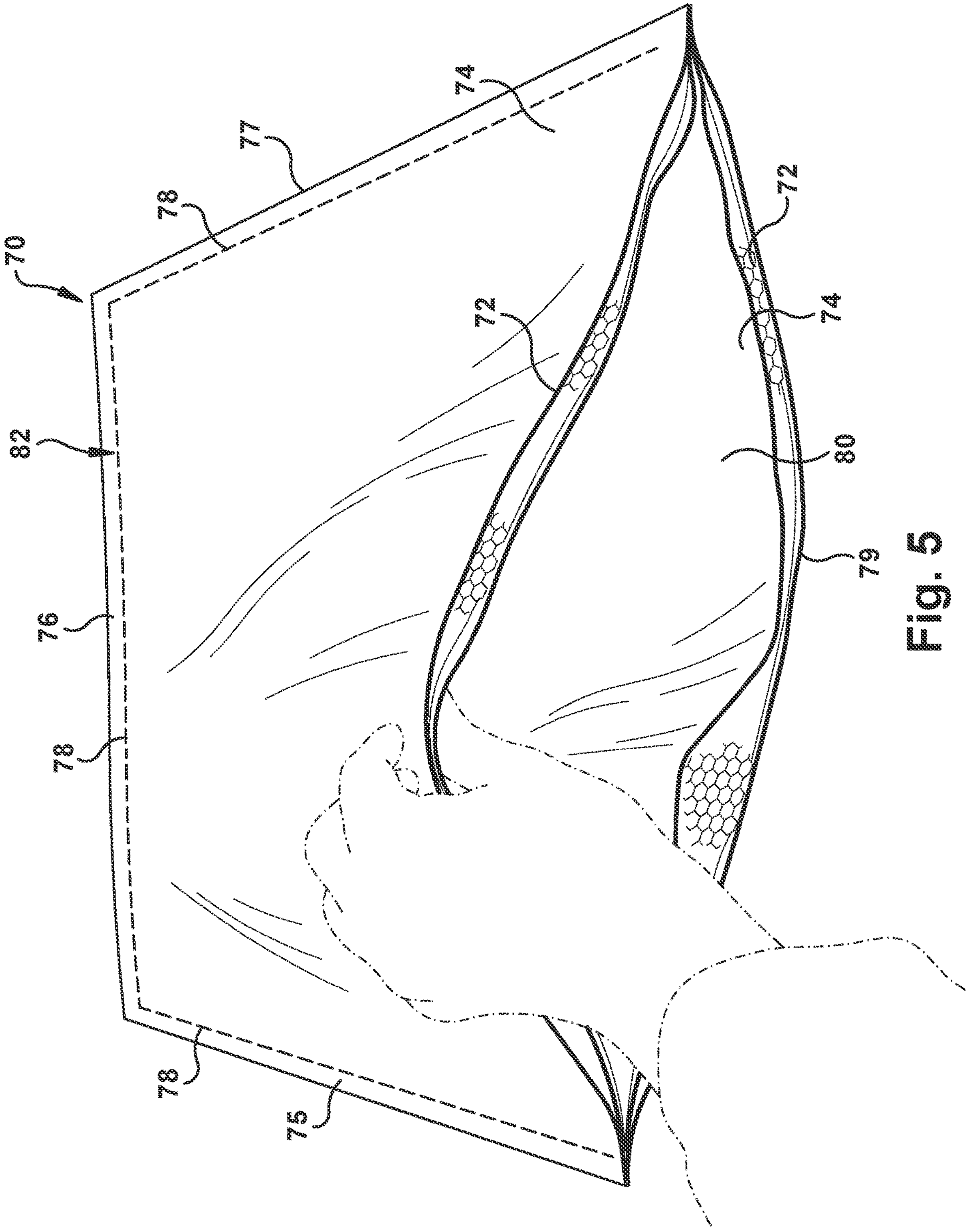
FIG. 5 shows an exemplary multi-layered paper bag that may be used with the bag forming apparatus in FIG. 1 for forming a flat bottom of the bag.

FIGS. 5-10 illustrate an exemplary method of forming a flat bottom of a bag. Referring initially to FIG. 5, an exemplary bag preform 70 is shown having a tubular shape, with a closed end forming a pouch. The material of the bag or bag preform 70 may be any suitable material or combination of materials, including paper, plastic, and the like. In exemplary embodiments, the material forming the bag or bag preform 70 may include paper, such as kraft paper or the like. In exemplary embodiments, the bag material includes multiple plies or layers, which may be difficult to handle and fold in a conventional bag forming machine. In the illustrated embodiment, for example, the bag material includes a cushioning or insulating material 72, such as an expanded or expandable slit-sheet material or other open-celled material. As shown, the cushioning or insulating material 72 may be bounded on at least one side, and preferably on both sides, with a continuous layer of sheet material 74. In the illustrated embodiment, the continuous layers 74 are formed by kraft paper. The continuous layers 74 may be adhered to portions of the cushioning or insulating material layer 72 to contain and protect the cushioning or insulating material between the continuous layers 74.

An exemplary expanded or expandable slit-sheet material may be made from one or more sheets of paper, such as kraft paper, in which each sheet has a plurality of spaced parallel rows of individual slits. The rows may extend transversely from one end of the paper material to the opposing end of said at least one sheet. Each of the rows is provided with interval spaces between consecutive slits and between each row. The plurality of slits extend transversely from one end of the paper material to the opposing end of the paper material with the slits in adjacent alternate rows each positioned adjacent the interval space between adjacent slits in the adjacent parallel row of slits. That is, the slits of one row are essentially opposite the spaces of the next row. Typically, the slits are arranged in a consistent, uniformly repeating pattern. The sheets are expandable by applying a force across the slits to open the slits and form a honeycomb-like pattern of openings in the expanded slit sheet material. The cushioning or insulating material formed by expanding the slit sheet may have an expanded thickness on the order of at least about ten times the unexpanded thickness of the sheet. The expanded slit sheet also is longer and narrower than the unexpanded slit sheet. An exemplary slit sheet material is described in U.S. Pat. No. 5,667,871, which is incorporated herein by reference.

As shown in FIG. 5, the bag preform 70 may be provided as a pouch that is bounded on at least three of its sides 75, 76, 77, such as with seams 78. On the fourth side 79, the bag preform has an opening 80 that opens into an internal pocket of the pouch. The operator inserts the tip 46 of the bag-forming apparatus 10 into the opening 80 of the pouch, or the pouch is inserted over the tip 46 of the bag-forming apparatus 10 via the opening 80. Other forms of bags or bag preforms also may be used with the exemplary bag forming apparatus 10. For example, the bag preform may be bounded on at least one side to form an open-ended tube with two openings on opposing ends. With such a tube-style bag preform, the tip 48 of the apparatus 10 may be inserted into one of the openings, while the opposite open side may be closed while forming the bottom of the bag. The bag material may be provided as a continuous strip, which can be severed at a desired length or is weakened, such as with perforations, to facilitate tearing the appropriate length of bag material from the continuous strip when ready to form a bag. The bag material may be wound into the form of a roll, fan-folded into a rectangular stack, or discrete segments may be provided in a rectangular stack ready for use.

FIG. 6 shows placement of the pouch-type bag preform 70 over the bag forming apparatus 10. As shown, the apparatus 10 is in its collapsed state and the tip 48 is inserted into the opening 80 of the bag preform 70. In the illustrated embodiment, the bag preform 70 is oriented such that the length of the tip 48 in the depth direction (X) is aligned with the seam 78 opposite the opening 80. The bag preform 70 is then pushed or pulled downwardly over the top 18 and opposing sidewalls 14, 16 until the tip 48 engages the inside bottom of the bag preform 70. As shown, the apparatus 10 is configured to have a sufficient height to accommodate the height of the bag preform 70. For different sized bags or bag preforms, different apparatus may be used, or the base 12 may be extended with a spacer to accommodate such longer sized bags, or the sides of the bag or preform may be bunched while the bottom of the bag is being formed.

FIG. 7 shows a user moving the bag preform 70 downwardly to deploy the top 18 from its collapsed state (with tip 48) into its expanded state (with platform 60). As shown, the user may press downwardly against the bottom of the bag preform 70, which causes the first and second top portions 28, 32 to pivot about the intermediate hinge 44 to the expanded state. In the expanded state, the first and second top portions 28, 32 extend horizontally relative to the base 12 to form the platform 60. As shown, the platform 60 may be sized to the bag preform 70, such that in the expanded state the platform 60 does not tear the bag. Also in the expanded state, the first and second sidewalls 14, 16 pivot about the respective lower hinges 26 to extend outwardly relative to each other. This permits the opening 80 at the top of the bag preform 70 to remain somewhat relaxed without tearing, while the bottom part of the bag preform 70 remains somewhat taught for forming the bottom 82 of the bag.

FIG. 8 shows the user forming the flat bottom 82 of the bag on the platform 60. Referring back to FIG. 7, when the user pushes the bottom of the bag preform 70 against the platform 60, gussets 84 may be formed. As shown in FIG. 8, during the forming the flat bottom 82, these gussets 84 are folded over and attached, such as with tape or other adhesive, to the bottom 82 of the bag preform 70. Depending on the configuration of the platform 60 shape, additional gussets may be formed that also would be folded over to form the bottom of the bag as desired.

Figure 9:
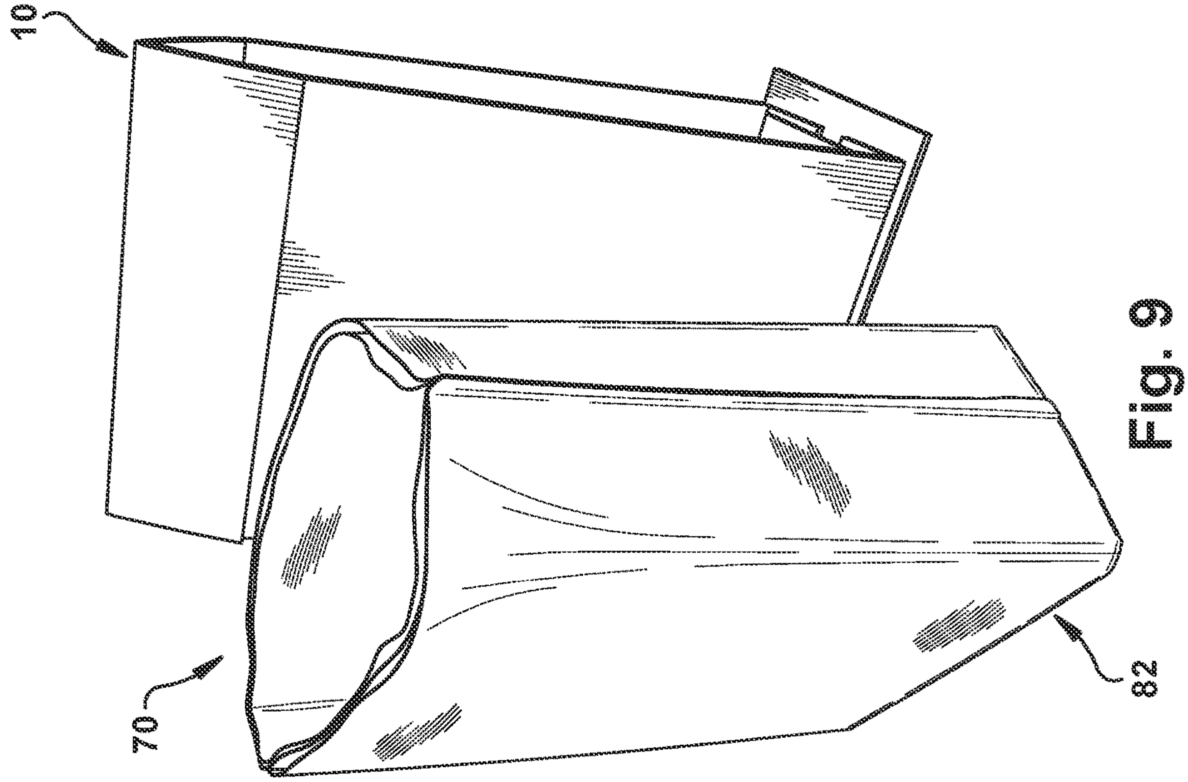

FIGS. 9 and 10 show a flat-bottomed bag that was formed from the bag preform 70 on the bag forming apparatus 10. In the illustrated embodiment, the flat-bottomed bag (also referred to with reference numeral 70) has a rectangular flat bottom 82. As shown, the flat-bottomed bag 70 with cushioning material 74 may now sit upright in a self-supported manner. This, in turn, may make it easier to fill the flat-bottomed bag 70.

FIGS. 11-16 illustrate alternative embodiments of bag forming apparatuses 110, 210, 310, 410, 510, and 610. The bag forming apparatuses 110-610 are substantially similar to the above-referenced bag forming apparatus 10, and consequently use the same reference numerals but respectively indexed by 100, 200, 300, 400, 500, and 600 to denote structures corresponding to similar structures in the bag forming apparatuses 10-610. In addition, the foregoing description of the bag forming apparatus 10 is equally applicable to the bag forming apparatuses 110-610, except as noted below. Moreover, aspects of the bag forming apparatuses 10-610 may be substituted for one another or used in conjunction with one another where applicable.

FIGS. 11A and 11B show another exemplary embodiment of a bag forming apparatus 110. FIG. 11A shows the apparatus 110 in an exemplary collapsed state, and FIG. 11B shows the apparatus 110 in an exemplary expanded state. As shown, the apparatus 110 includes a base 112, opposing sidewalls 114, 116 that extend upright relative to the base 112, and a top 118 that is operably coupled to an upper portion 130, 134 of each of the sidewalls. The top 118 may be operably coupled to the sidewalls 114, 116 with respective upper hinges 140, and the base 112 may be operably coupled to sidewalls 114, 116 with respective lower hinges 126. The top 118 includes respective first and second top portions 128, 132 that are pivotable relative to each other about an intermediate pivot axis 145. The intermediate pivot axis 145 may be provided by an intermediate hinge that operably couples the first and second top portions 128, 132 together. In the collapsed state (FIG. 11A), the upper portions 130, 134 of the respective sidewalls 114, 116 are closer together compared to the expanded state, and the top 118 (e.g., top portions 128, 132) extends upright relative to the base 112 to form a tip 148 that is configured for insertion into an opening of a bag. In the expanded state (FIG. 11B), the upper portions 130, 134 of the respective sidewalls 114, 116 are spaced further apart compared to the collapsed state, and the top 118 extends horizontally relative to the base 112 to form a platform 160 that is configured for forming the flat bottom of the bag. In the illustrated embodiment, the first and second sidewalls 114, 116 extend upright perpendicularly to the base 112 in the collapsed state (FIG. 11A). In the expanded state (FIG. 11B), the first and second sidewalls 114, 116 are inclined upwardly and outwardly away from each other, which may facilitate forming the bottom of the bag.

FIGS. 12A and 12B show another exemplary embodiment of a bag forming apparatus 210. FIG. 12A shows the apparatus 210 in an exemplary collapsed state, and FIG. 12B shows the apparatus 210 in an exemplary expanded state. As shown, the apparatus 210 includes a base 212, opposing sidewalls 214, 216 that extend upright relative to the base 212, and a top 218 that is operably coupled to an upper portion 230, 234 of each of the sidewalls. The top 218 may be operably coupled to the sidewalls 214, 216 with respective upper hinges 240, and the base 212 may be operably coupled to sidewalls 214, 216 with respective lower hinges 226. The top 218 includes respective first and second top portions 228, 232 that are pivotable relative to each other about an intermediate pivot axis 245. The intermediate pivot axis 245 may be provided by an intermediate hinge that operably couples the first and second top portions 228, 232 together. In the collapsed state (FIG. 12A), the upper portions 230, 234 of the respective sidewalls 214, 216 are closer together compared to the expanded state, and the top 218 (e.g., top portions 228, 232) extends upright relative to the base 212 to form a tip 248 that is configured for insertion into an opening of a bag. In the expanded state (FIG. 12B), the upper portions 230, 234 of the respective sidewalls 214, 216 are spaced further apart compared to the collapsed state, and the top 218 extends horizontally relative to the base 212 to form a platform 260 that is configured for forming the flat bottom of the bag. In the illustrated embodiment, the first and second sidewalls 214, 216 are inclined upwardly and inwardly toward each other in the collapsed state (FIG. 12A). In the expanded state (FIG. 12B), the first and second sidewalls 214, 216 extend upright perpendicularly to the base 112.

FIGS. 13A and 13B show another exemplary embodiment of a bag forming apparatus 310. FIG. 13A shows the apparatus 310 in an exemplary collapsed state, and FIG. 13B shows the apparatus 310 in an exemplary expanded state. As shown, the apparatus 310 includes a base 312, opposing sidewalls 314, 316 that extend upright relative to the base 312, and a top 318 that is operably coupled to an upper portion 330, 334 of each of the sidewalls. The top 318 may be operably coupled to the sidewalls 314, 316 with respective upper hinges 340, and the base 312 may be operably coupled to sidewalls 314, 316 with respective lower hinges 326. The top 318 includes respective first and second top portions 328, 332 that are pivotable relative to each other about an intermediate pivot axis 345. The intermediate pivot axis 345 may be provided by an intermediate hinge that operably couples the first and second top portions 328, 332 together. In the collapsed state (FIG. 13A), the upper portions 330, 334 of the respective sidewalls 314, 316 are closer together compared to the expanded state, and the top 318 (e.g., top portions 328, 332) extends upright relative to the base 312 to form a tip 348 that is configured for insertion into an opening of a bag. In the expanded state (FIG. 13B), the upper portions 330, 334 of the respective sidewalls 314, 316 are spaced further apart compared to the collapsed state, and the top 318 extends horizontally relative to the base 312 to form a platform 360 that is configured for forming the flat bottom of the bag. In the illustrated embodiment, base 312 includes multiple discrete base parts 312*a*, 312*b*, with each sidewall 314, 316 being operably coupled to a respective base part 312*a*, 312*b*.

FIGS. 14A and 14B show another exemplary embodiment of a bag forming apparatus 410. FIG. 14A shows the apparatus 410 in an exemplary collapsed state, and FIG. 14B shows the apparatus 410 in an exemplary expanded state. As shown, the apparatus 410 includes a base 412, opposing sidewalls 414, 416 that extend upright relative to the base 412, and a top 418 that is operably coupled to an upper portion 430, 434 of each of the sidewalls. The top 418 may be operably coupled to the sidewalls 414, 416 with respective upper hinges 440, and the base 412 may be operably coupled to sidewalls 414, 416 with respective lower hinges 426. The top 418 includes respective first and second top portions 428, 432 that are pivotable relative to each other about an intermediate pivot axis 445. The intermediate pivot axis 445 may be provided by an intermediate hinge that operably couples the first and second top portions 428, 432 together. In the collapsed state (FIG. 14A), the upper portions 430, 434 of the respective sidewalls 414, 416 are closer together compared to the expanded state, and the top 418 (e.g., top portions 428, 432) extends upright relative to the base 412 to form a tip 448 that is configured for insertion into an opening of a bag. In the expanded state (FIG. 14B), the upper portions 430, 434 of the respective sidewalls 414, 416 are spaced further apart compared to the collapsed state, and the top 418 extends horizontally relative to the base 412 to form a platform 460 that is configured for forming the flat bottom of the bag. In the illustrated embodiment, base 412 includes multiple discrete base parts 412*a*, 412*b*, with each base part having an upward extension portion 380*a*, 380*b* to which each sidewall 414, 416 is operably coupled.

FIGS. 15A and 15B show another exemplary embodiment of a bag forming apparatus 510. FIG. 15A shows the apparatus 510 in an exemplary collapsed state, and FIG. 15B shows the apparatus 510 in an exemplary expanded state. As shown, the apparatus 510 includes a base 512, opposing sidewalls 514, 516 that extend upright relative to the base 512, and a top 518 that is operably coupled to an upper portion 530, 534 of each of the sidewalls. The top 518 may be operably coupled to the sidewalls 514, 516 with respective upper hinges 540, and the base 512 may be operably coupled to sidewalls 514, 516 with respective lower hinges 526. The top 518 includes respective first and second top portions 528, 532 that are pivotable relative to each other about an intermediate pivot axis 545. The intermediate pivot axis 545 may be provided by an intermediate hinge that operably couples the first and second top portions 528, 532 together. In the collapsed state (FIG. 15A), the upper portions 530, 534 of the respective sidewalls 114, 116 are closer together compared to the expanded state, and the top 518 (e.g., top portions 528, 532) extends upright relative to the base 512 to form a tip 548 that is configured for insertion into an opening of a bag. In the expanded state (FIG. 15B), the upper portions 530, 534 of the respective sidewalls 514, 516 are spaced further apart compared to the collapsed state, and the top 518 extends horizontally relative to the base 512 to form a platform 560 that is configured for forming the flat bottom of the bag. In the illustrated embodiment, the first and second sidewalls 514, 516 are located close together in the collapsed state (FIG. 15A) to form a slender profile for insertion into the bag. In exemplary embodiments, the first and second sidewalls 514, 516 may engage each other in the collapsed state, such as along a majority or an entirety of the length of the sidewalls 514, 516. As shown in the collapsed state, the first and second sidewalls 514, 516 extend upright perpendicularly to the base 512. In the expanded state (FIG. 11B), the first and second sidewalls 114, 116 are inclined upwardly and outwardly away from each other with their respective lower portions being in close proximity or touching.

FIGS. 16A and 16B show another exemplary embodiment of a bag forming apparatus 610. FIG. 16A shows the apparatus 610 in an exemplary collapsed state, and FIG. 16B shows the apparatus 610 in an exemplary expanded state. As shown, the apparatus 610 includes a base 612, opposing sidewalls 614, 616 that extend upright relative to the base 612, and a top 618 that is operably coupled to an upper portion 630, 634 of each of the sidewalls. The top 118 may be operably coupled to the sidewalls 614, 616 with respective upper hinges 640. The top 618 includes respective first and second top portions 628, 632 that are pivotable relative to each other about an intermediate pivot axis 645. The intermediate pivot axis 645 may be provided by an intermediate hinge that operably couples the first and second top portions 628, 632 together. In the collapsed state (FIG. 16A), the upper portions 630, 634 of the respective sidewalls 614, 616 are closer together compared to the expanded state, and the top 618 (e.g., top portions 628, 632) extends upright relative to the base 612 to form a tip 648 that is configured for insertion into an opening of a bag. In the expanded state (FIG. 16B), the upper portions 630, 634 of the respective sidewalls 614, 616 are spaced further apart compared to the collapsed state, and the top 618 extends horizontally relative to the base 612 to form a platform 660 that is configured for forming the flat bottom of the bag. In the illustrated embodiment, the first and second sidewalls 614, 616 are non-pivotably fixed to the base 612. As shown in the expanded state (FIG. 16B), the first and second sidewalls 614, 616 are configured to flex to accommodate the movement of the top 618 and sidewalls 614, 616 when forming the platform 660.

Exemplary bag forming apparatuses 10-610 and an exemplary method for forming the bottom of a bag have been described herein. The exemplary bag forming apparatus (10-610) includes a base (12-612), opposing sidewalls (14-614, 16-616) that extend upright relative to the base, and a top (18-618) that is operably coupled to an upper portion (30-630, 34-634) of each of the sidewalls. The top has an intermediate pivot axis (45-645) between the sidewalls that enables the top to pivot about the pivot axis between a collapsed state and an expanded state. In the collapsed state, the upper portions of the respective sidewalls are closer together and the top extends upright relative to the base to form a tip (48-648) that is configured for insertion into an opening of the bag. In the expanded state, the upper portions of the respective sidewalls are spaced further apart, and the top extends horizontally relative to the base to form a platform (60-660) that is configured for forming the flat bottom of the bag.

Such an exemplary bag forming apparatus (10-610) may provide a simplified construction that enables a user to manually form the flat bottom of a bag, such as at the point of use. More particularly. the bag forming apparatus may be designed as a relatively small fixture, with which the user forms the flat bottom of the bag just prior to its use. The simplified construction of the bag forming apparatus may make it inexpensive to manufacture and reproduce, lighter and more compact than existing bag-making machinery, and thus may be deployed at or moved between many point of use locations.

According to an aspect of the present disclosure, a bag forming apparatus for forming a bottom of a bag includes: a base; opposing sidewalls, each sidewall being operably coupled at a lower portion thereof for enabling movement of the sidewalls relative to each other; a top operably coupled to an upper portion of each of the sidewalls, the top having an intermediate pivot axis between the sidewalls, wherein the top is pivotable about the pivot axis to move between a collapsed state and an expanded state; where in the collapsed state, the upper portions of the respective sidewalls are closer together and the top extends upright relative to the base to form a tip that is configured for being received in an opening of the bag; and where in the expanded state, the upper portions of the respective sidewalls are spaced further apart and the top extends horizontally relative to the base to form a platform that is configured for forming the flat bottom of the bag.

According to another aspect of the present disclosure, a bag forming apparatus for forming a paper bag having a flat bottom includes: a base; first and second sidewalls that extend upright relative to the base, each of the first and second sidewalls being hinged for pivotable movement relative to the base and relative to each other; and a top having a first top portion that is hinged to the first sidewall, and a second top portion that is hinged to the second sidewall, the first and second top portions being hinged together at an intermediate pivot location between the first and second sidewalls for enabling the first and second top portions to pivot relative to each other between a collapsed state and expanded; where in the collapsed state, the first and second top portions are inclined relative to the base to form a tip that is configured to facilitate the top and sidewalls to be received in an opening of the bag; and where in the expanded state, the first and second top portions are horizontal relative to the base to form a platform that is configured to facilitate formation of the flat bottom of the bag.

Embodiments may include the foregoing aspect(s) in combination with one or more of the following additional features, separately or in any combination.

In some embodiments, where in the collapsed state, the tip is formed at the intermediate pivot location of the top that is at an elevation above the first and second sidewalls.

In some embodiments, where in the expanded state, the first and second top portions are coplanar with each other to form the platform with a flat upper surface.

In some embodiments, the first and second sidewalls are each hinged at a lower portion thereof.

In some embodiments, the first and second top portions are respectively hinged to the first and second sidewalls at an upper portion thereof.

In some embodiments, where in the collapsed state, the first and second top portions are inclined upwardly and inwardly toward each other to form the tip.

In some embodiments, where in the collapsed state, the first and second sidewalls are inclined upwardly and inwardly toward each other.

In some embodiments, where in in the expanded state, the first and second sidewalls are perpendicular to the base and parallel to each other.

In some embodiments, where in the expanded state, the first and second sidewalls are inclined upwardly and outwardly away from each other.

In some embodiments, the first and second sidewalls oppose each other and are hinged to opposite sides of the base.

In some embodiments, the base is a single base.

In some embodiments, the base includes multiple discrete bases.

In some embodiments, the apparatus includes respective lower hinges that operably couple the first and second sidewalls to the base, and includes respective upper hinges that operably couple the first and second sidewalls to the respective first and second top portions, and includes at least one intermediate hinge that operably couples the first and second top portions at the intermediate location.

In some embodiments, one or more of the respective upper hinges, respective lower hinges, and at least one intermediate hinge is a living hinge, a barrel hinge, or any other suitable hinge.

In some embodiments, the apparatus further includes a biasing member operably coupled to the first and second sidewalls, wherein the biasing member biases the apparatus toward the collapsed state.

In some embodiments, the biasing member is a coil spring interposed between the first and second sidewalls.

In some embodiments, the first and second top portions have respective mating faces at the intermediate pivot location, the respective mating faces being configured to engage each other when the apparatus is in the expanded state, thereby restricting further pivotable movement of the first and second top portions.

In some embodiments, the first and second sidewalls are spaced apart in a width direction of the apparatus.

In some embodiments, one or more upright supports are disposed between the first and second sidewalls, the upright supports being configured to engage and support the sidewalls when the apparatus is in the collapsed state.

In some embodiments, each of the one or more upright supports has opposite tapered surfaces that respectively face the first and second sidewalls, the opposite tapered surfaces being configured to engage and support the sidewalls when the apparatus is in the collapsed state.

In some embodiments, the one or more upright supports includes two upright supports that are spaced apart in a depth direction of the apparatus.

In some embodiments, the first and second top portions form a rectangular shape for forming the bottom of the bag in a rectangular shape.

In some embodiments, the apparatus is in combination with the paper bag.

In some embodiments, the bag includes a slit sheet material.

According to another aspect of the present disclosure, a method of forming a flat-bottomed bag includes the following steps: (i) placing a bag preform over a top and opposing sidewalls of a bag forming apparatus that is in a collapsed state, where in the collapsed state the top of the apparatus extends upright relative to a base of the apparatus to form a tip that is received in an opening of the bag preform during the placing step; (ii) engaging the top of the apparatus, where the engaging step causes the top to pivot about an intermediate portion of the top to an expanded state, where in the expanded state the top extends horizontally relative to the base of the apparatus to form a platform; and (iii) forming a flat bottom of the bag preform on the platform to thereby form the flat-bottomed bag.

Embodiments may include the foregoing aspect in combination with one or more of the following additional features, separately or in any combination.

In some embodiments, the method further includes the step of: providing the bag forming apparatus for forming the flat-bottomed bag; where the opposing sidewalls are respectively hinged at lower portions thereof; where the top includes a first portion hinged to an upper portion of one of the opposing sidewalls, and a second portion hinged to an upper portion of an other one of the opposing sidewalls; and where the first and second top portions are hinged together at the intermediate portion of the top.

In some embodiments, during the placing step when the bag forming apparatus is in the collapsed state, the upper portions of the respective sidewalls are closer together and the top extends upright relative to a base of the apparatus to form the tip at an elevation above the opposing sidewalls.

In some embodiments, during the engaging step, the bag forming apparatus is transformed to the expanded state, such that the upper portions of the respective sidewalls are moved to locations that are spaced further apart, and the top is moved to extend horizontally relative to the base to form the platform.

In some embodiments, the method further includes the step of: providing the bag preform; where the bag preform is bounded on at least one side to form a tube, the tube having first and second openings on opposite sides thereof, where the placing step includes inserting the tip of the apparatus into the first opening, and where the forming step includes forming the bottom of the bag preform on the side of the tube with the second opening.

In some embodiments, the method further includes the step of: providing the bag preform; where the bag preform is bounded on at least three sides to form a pouch, the pouch having an opening that opens into a pocket; where the placing step includes inserting the tip of the apparatus into the opening; where the engaging step includes moving the bag preform downwardly to engage an inside bottom of the pouch with the top of the apparatus; and where the forming step includes forming the bottom of the bag preform on a bounded side of the pouch that is opposite the opening.

In some embodiments, the step of forming the flat bottom of the bag preform includes folding the bag preform.

In some embodiments, during the step of forming of the flat bottom of the bag preform, gussets are formed that are folded over and attached to the bottom.

In some embodiments, the forming step includes forming the bottom of the bag preform as a rectangular bottom.

In some embodiments, the method further includes the step of providing the bag preform, where the bag preform is a multi-layered material.

In some embodiments, the multi-layered material includes a cushioning material or an insulating material.

In some embodiments, the cushioning material or insulating material includes slit sheet material.

In some embodiments, the cushioning material is bounded on at least one of its sides with a layer of continuous sheet.

The terms such as "top," "bottom," "upper," "lower," "left," "right," "front," "rear," "forward," "rearward," and the like as used herein may refer to an arbitrary frame of reference, rather than to the ordinary gravitational frame of reference.

As used herein, an "operable coupling," "operable connection," or a coupling/connection by which entities are operably coupled/connected, is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A bag forming apparatus for forming a paper bag having a flat bottom, the bag forming apparatus comprising:
- a base;
- first and second sidewalls that extend upright relative to the base, each of the first and second sidewalls being hinged for pivotable movement relative to the base and relative to each other;
- a top having a first top portion that is hinged to the first sidewall, and a second top portion that is hinged to the second sidewall, the first and second top portions being hinged together at an intermediate pivot location between the first and second sidewalls for enabling the first and second top portions to pivot relative to each other between a collapsed state of the apparatus and an expanded state of the apparatus;
- one or more supports disposed between the first and second sidewalls, the supports being configured to engage and support the first and second sidewalls when the first and second sidewalls are in the collapsed state and disengage from the first and second sidewalls when the first and second sidewalls are in the expanded state; and
- a biasing member operably coupled to the first and second sidewalls, wherein the biasing member biases the apparatus toward the collapsed state;
- wherein in the collapsed state, the first and second top portions are inclined relative to the base to form a tip that is configured to facilitate inserting the top and the sidewalls in an opening of the bag; and wherein in the expanded state, the first and second top portions are coplanar with each other to form a platform that is configured to facilitate formation of the flat bottom of the bag.

2. The apparatus as set forth in claim 1, wherein in the collapsed state, the tip is formed at the intermediate pivot location of the top that is at an elevation above the first and second sidewalls.

3. The apparatus as set forth in claim 1, wherein the first and second top portions are respectively hinged to the first and second sidewalls at an upper portion thereof.

4. The apparatus as set forth in claim 1, wherein in the collapsed state, the first and second top portions are inclined upwardly and inwardly toward each other to form the tip.

5. The apparatus as set forth in claim 1, wherein in the collapsed state, the first and second sidewalls are inclined upwardly and inwardly toward each other.

6. The apparatus as set forth in claim 1, wherein in the expanded state, the first and second sidewalls are perpendicular to the base and parallel to each other; or wherein in the expanded state, the first and second sidewalls are inclined upwardly and outwardly away from each other.

7. The apparatus as set forth in claim 1, wherein the first and second sidewalls oppose each other and are hinged to spaced locations on the base.

8. The apparatus as set forth in claim 1, wherein the first and second top portions have respective mating faces at the intermediate pivot location, the respective mating faces being configured to engage each other in the expanded state to restrict further pivotable movement of the first and second top portions.

9. The apparatus as set forth in claim 1, wherein the first and second sidewalls are spaced apart in a width direction to receive the one or more supports therebetween.

10. The apparatus as set forth in claim 1, wherein in the expanded state the first and second top portions define a rectangular shape for forming the bottom of the bag in a rectangular shape.

11. The apparatus as set forth in claim 1, wherein in the collapsed state upper portions of the respective first and second sidewalls are closer together and the top extends upright relative to the base to form the tip that is configured for being received in the opening of the bag; and wherein in the expanded state the upper portions of the respective first and second sidewalls are spaced further apart, and the first and second top portions are coplanar with each other to form a platform that is configured to facilitate formation of the flat bottom of the bag.

12. A method of forming a flat-bottomed bag, comprising the following steps:

placing a bag preform over a top and opposing sidewalls of a bag forming apparatus that is in a collapsed state, wherein in the collapsed state a top of the apparatus extends upright relative to a horizontal base of the apparatus to form a tip that is received in an opening of the bag preform during the placing step;

supporting the opposing sidewalls with a support disposed between the sidewalls, the support engaging and supporting the sidewalls when the sidewalls are in the collapsed state and disengaging from the first and second sidewalls when the first and second sidewalls are in the expanded state;

biasing the apparatus toward the collapsed state with a biasing member operably coupled to the sidewalls;

engaging the top of the apparatus, wherein the engaging step causes the top to pivot about an intermediate portion of the top from the collapsed state to an expanded state, and wherein in the expanded state the top extends horizontally to form a platform; and forming a flat bottom of the bag preform on the platform to thereby form the flat-bottomed bag.

13. The method as set forth in claim 12, further comprising the step of:

providing the bag forming apparatus for forming the flat-bottomed bag, the bag forming apparatus including the base, the opposing sidewalls extending from the base, and the top at upper portions of the opposing sidewalls;

wherein the opposing sidewalls are respectively hinged at lower portions thereof to the base;

wherein the top includes a first portion hinged to an upper portion of a first one of the opposing sidewalls, and a second portion hinged to an upper portion of a second one of the opposing sidewalls;

wherein the first and second top portions are hinged together at the intermediate portion of the top;

wherein the engaging step causes the first and second top portions to pivot about the intermediate portion from the collapsed state to the expanded state such that the first and second top portions are coplanar and form the platform.

14. The method as set forth in claim 13, wherein during the step of forming the flat bottom of the bag preform, gussets are formed that are folded over and attached.

15. The method as set forth in claim 12, wherein during the placing step when the bag forming apparatus is in the collapsed state, the upper portions of the respective opposing sidewalls are closer together and the top extends upright relative to the base to form the tip at an elevation above the opposing sidewalls; and wherein during the engaging step, the bag forming apparatus is transformed to the expanded state, such that the upper portions of the respective sidewalls are moved to locations that are spaced further apart, and the top is moved to extend horizontally to form the platform.

16. The method as set forth in claim 12, further comprising the step of:

providing the bag preform;

wherein the bag preform is bounded on at least one side to form a tube, the tube having first and second openings on opposite ends thereof, wherein the placing step includes inserting the tip of the apparatus into the first opening, and wherein the forming step includes forming the flat bottom of the bag preform adjacent the second opening.

17. The method as set forth in claim 12, where the step of forming the flat bottom of the bag preform includes folding the bag preform.

* * * * *